United States Patent [19]

Vernieres et al.

[11] Patent Number: 4,740,952
[45] Date of Patent: Apr. 26, 1988

[54] DEVICE FOR THE SIMULTANEOUS TRANSMISSION OF TWO DATA SIGNALS OVER THE SAME ELECTRICAL LINE IN OPPOSITE DIRECTIONS

[75] Inventors: Francois Vernieres, Toulouse; Serge Ramet, Grenoble, both of France

[73] Assignee: Bendix Electronics S.A., Toulouse, France

[21] Appl. No.: 922,571

[22] Filed: Oct. 23, 1986

[30] Foreign Application Priority Data

Oct. 30, 1985 [FR] France ................ 85 16155

[51] Int. Cl.⁴ .................................... H04B 1/56
[52] U.S. Cl. .......................... 370/24; 370/27
[58] Field of Search ......................... 370/24, 27

[56] References Cited

U.S. PATENT DOCUMENTS 4,477,896 10/1984 Aker ................................ 370/24

FOREIGN PATENT DOCUMENTS 0051529 12/1982 European Pat. Off. ............ 370/24
0175656 3/1986 European Pat. Off. ............ 370/24
2130457 5/1984 United Kingdom ................ 370/24

Primary Examiner—Robert L. Griffin
Assistant Examiner—Leslie van Beek
Attorney, Agent, or Firm—Russel C. Wells; Markell Seitzman

[57] ABSTRACT

This device comprises, at a first end (1) of the line, at least one controlled voltage source (SV2) and a current receiver (RI2) capable of detecting the current (I) flowing in the line (L) and, at the second end (3) of the line, at least one controlled current source (SI2) and a voltage receiver (RV2) capable of detecting the voltage (V) present on the line, the controlled current source (SI2) being adapted to impose the flowing in the line (L) of a programmable current (I) that is independent of the voltage receiver (RV2), of the voltage source SV2) and of the current receiver (RI2), while the controlled voltage source (SV2) is adapted to impose on the line (L) a programmable voltage (V) that is independent of the current source (SI2), of the current receiver (RI2) and of the voltage receiver (RV2).

Application to electronic ignition systems for internal combustion engines.

4 Claims, 4 Drawing Sheets

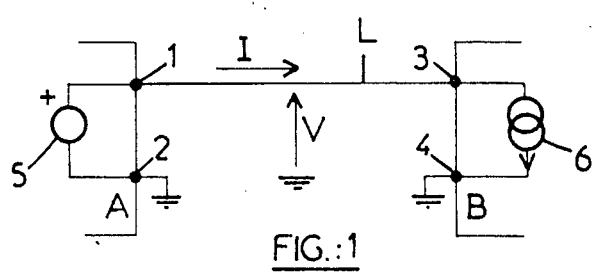
FIG.:1
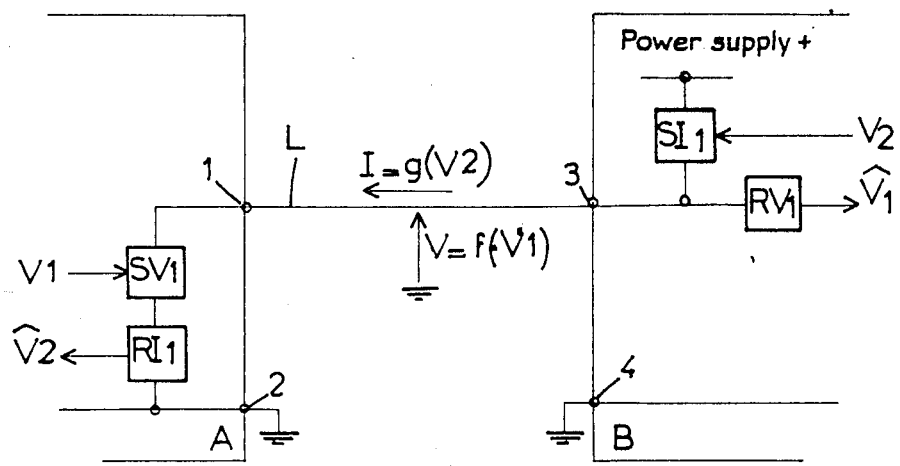
FIG.:2
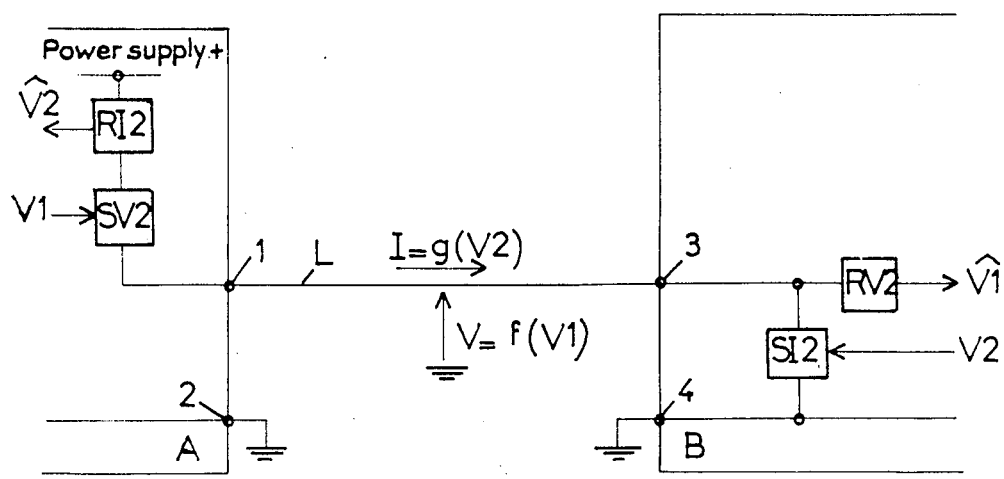
FIG.:3

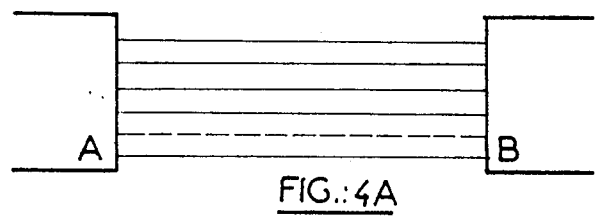
FIG.:4A
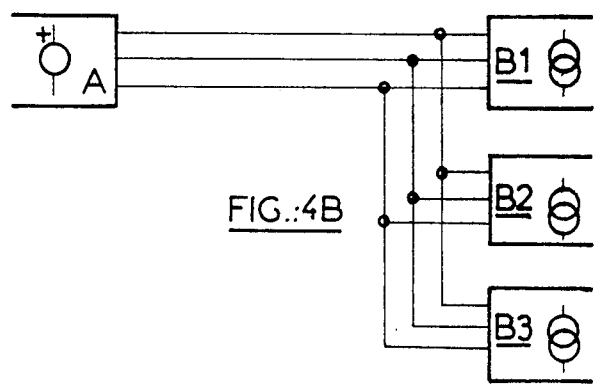
FIG.:4B
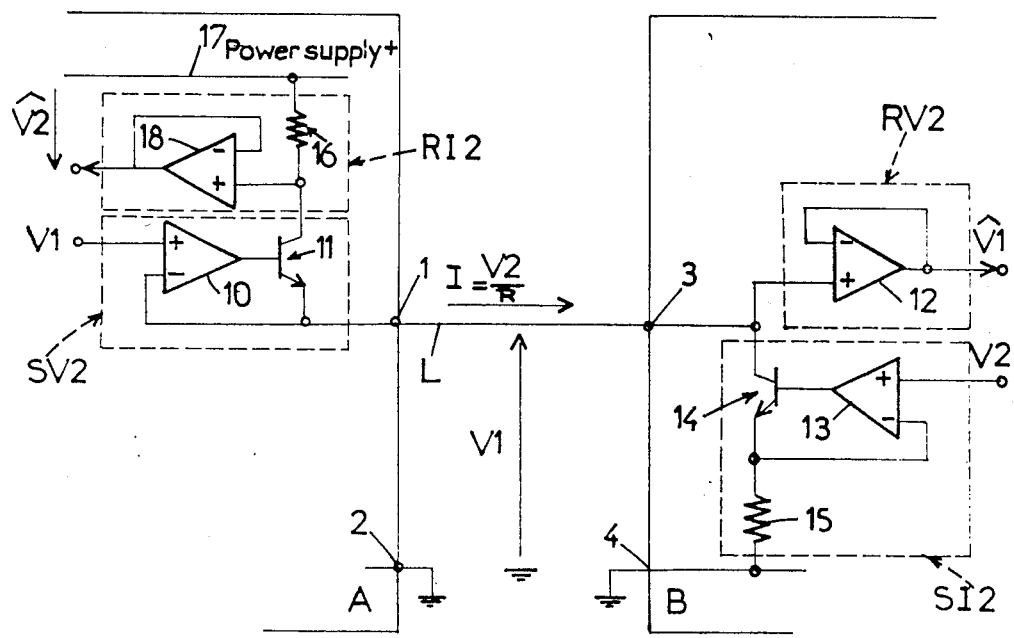
FIG.:5

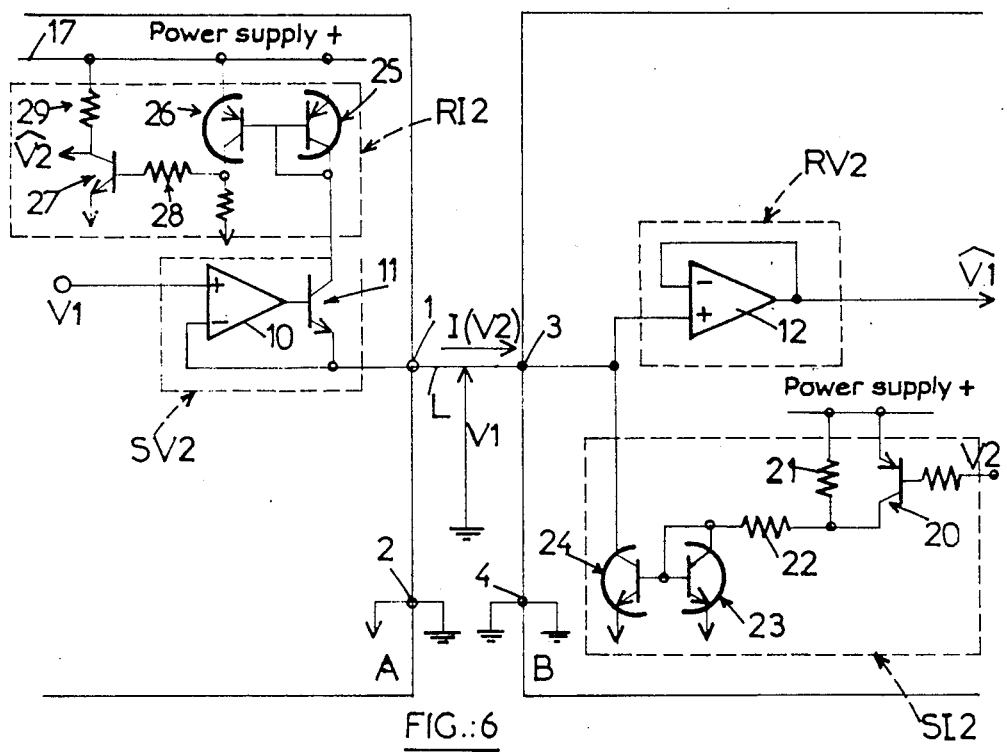
FIG.:6
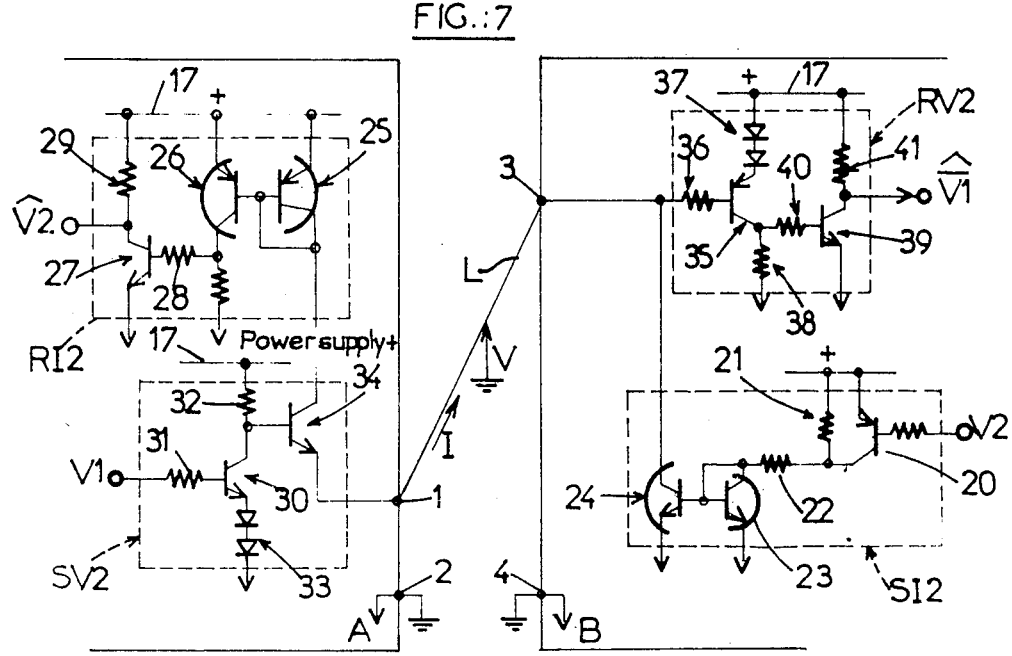
FIG.:7

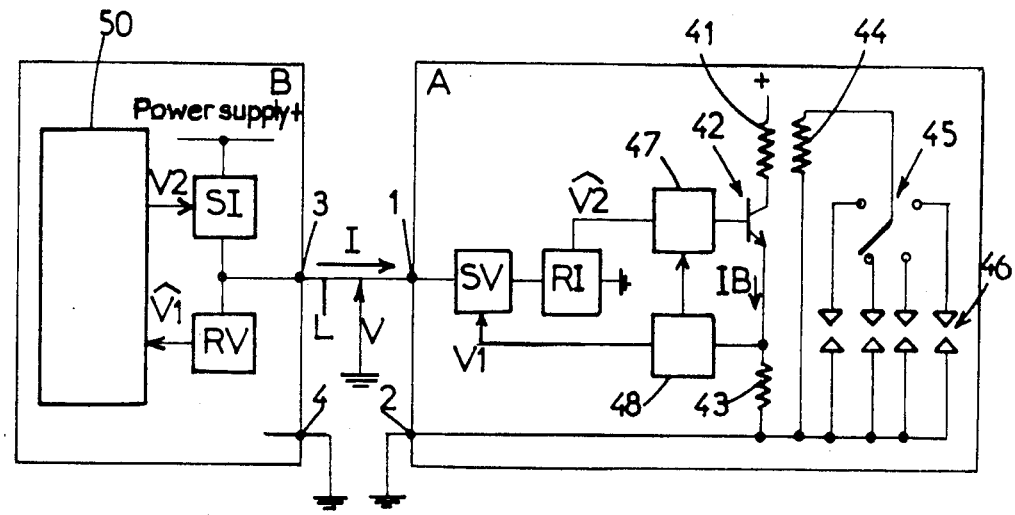
FIG.:8
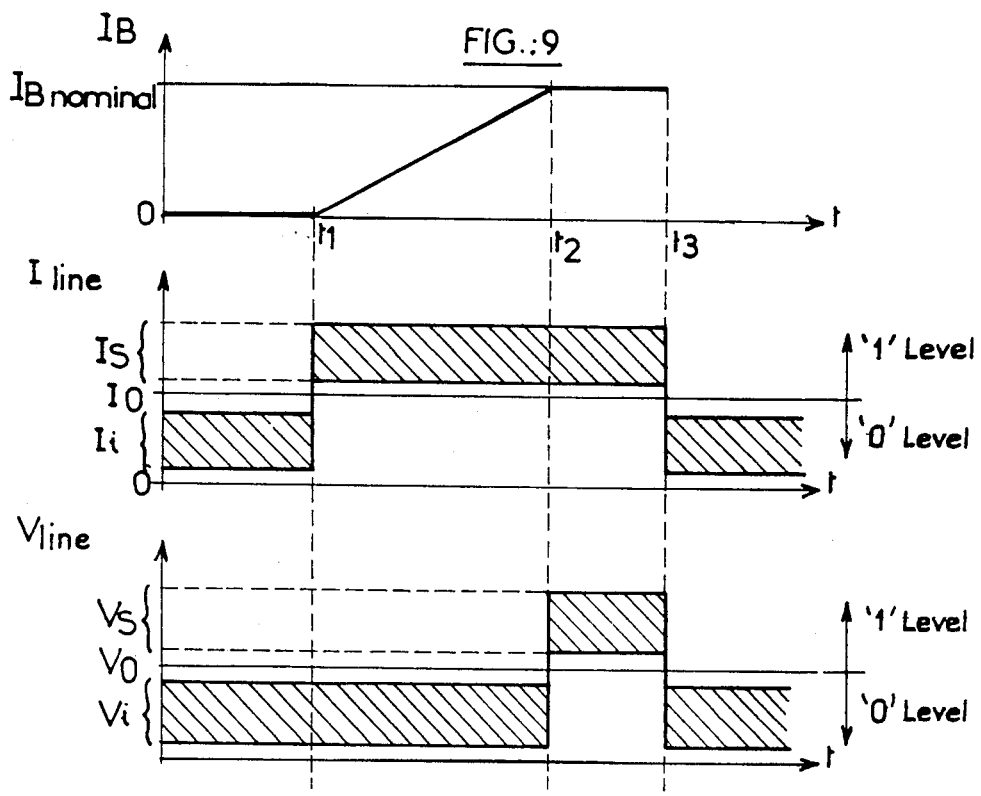
FIG.:9

DEVICE FOR THE SIMULTANEOUS TRANSMISSION OF TWO DATA SIGNALS OVER THE SAME ELECTRICAL LINE IN OPPOSITE DIRECTIONS

The present invention relates to a device for the simultaneous transmission of two data signals over the same electrical line in opposite directions.

BACKGROUND OF THE INVENTION

The solution most commonly used to enable two electronic modules to exchange data signals between each other consists in connecting them together with two electrical lines. One of the lines is used for transmitting data signals in one direction, the other for transmitting them in the opposite direction. This solution of course has the disadvantage of necessitating three or even four electrical connections and a length of electrical line of at least equal to twice the distance separating the two modules. In applications where a large number of electronic modules have to exchange data signals between each other, the cost of the electrical lines and their wiring can become prohibitive, while the overall reliability becomes proportionally degraded. This type of problem is particularly encountered on board motor vehicles in which the amount of electrical and electronic equipment has increased considerably during recent years.

It is already known that one answer to this problem is provided by making use of multiplexing. This technique in fact enables two electronic modules to exchange data signals in both directions by means of a single link. In the case of frequency multiplexing, at least one of the two data signals is transmitted by modulation and then demodulation of a carrier, while in time multiplexing, the exchange of data signals is not truly simultaneous but is organized by a line occupancy protocol. However, it is also known that multiplexing is a complex and expensive technique which cannot be directly adapted to an existing electronic architecture and necessitates an entirely new definition of that architecture.

Contrary to this, the invention aims at providing a device for the simultaneous transmission of two data signals over the same electrical line in opposite directions which can be used in replacement of the traditional two-line electrical links with no fundamental reconsideration of the architecture of the electrical or electronic systems concerned.

SUMMARY OF THE INVENTION

For this purpose according to the present invention there is provided a device for the simultaneous transmission of two data signals over the same electrical line in opposite directions, wherein the data signals are represented by the electrical voltage and current present on the line, respectively, this device comprising, at a first end of the line, at least one controlled voltage source and a current receiver capable of detecting the current flowing in the line and at the second end of the line, at least one controlled current source and a voltage receiver capable of detecting the voltage present on the line, wherein the two data signals are provided to the device in the form of voltage signals, this device being characterized in that the controlled voltage source imposes on the line a voltage depending on a first voltage signal which is applied to it as an input and the voltage receiver generates from the voltage detected on the line an output voltage that is an image of the first voltage signal, while the controlled current source imposes in the line the flow of a current depending on a second voltage signal which is applied to it as an input and the current receiver generates fror the current detected in the line an output voltage which is an image of the second voltage signal.

The invention will now be described by way of examples with reference to the accompanying drawings in which:

DESCRIPTION OF THE DRAWINGS

FIG. 1 is a basic electrical diagram illustrating the invention;

FIG. 2 is a block diagram of a first embodiment of the device according to the invention;

FIG. 3 is a block diagram of a second embodiment of the device according to the invention;

FIGS. 4A and 4B are diagrams showing two possible applications of the device according to the invention;

FIG. 5 is an electrical circuit diagram of a first embodiment of the device shown in FIG. 3;

FIG. 6 is an electrical circuit diagram of a second embodiment of the device shown in FIG. 3;

FIG. 7 is an electrical circuit diagram of a third embodiment of the device shown in FIG. 3;

FIG. 8 is a block diagram of the device according to the invention connected to a first electronic module for the generation of coil ignition sparks for an internal combustion engine and to a second electronic module for producing the conduction time of the coil, respectively; and FIG. 9 is a timing diagram showing some of the signals generated in the circuit shown in FIG. 8.

DETAILED DESCRIPTION

FIG. 1 shows an electronic module A connected to an electronic module B by an electrical line L. In the description following, references 1, 2, and 3, 4 will designate the connection points of modules A and B to the line L and to ground, respectively. Inside module A a voltage source 5 produces a voltage V between points 1 and 2, while a current source 6 connected between points 3 and 4 in module B makes a current I flow in the line L.

The result of this arrangement is that a first data signal is transmitted from module A towards module B in the form of the voltage V applied between points 1 and 2 and which appears again between points 3 and 4. A second data signal is simultaneously transmitted via line L from module B towards module A in the form of the current I which flows from A towards B. The values of V and I can vary continuously (analog) or can take discrete values representing, for example, the logic levels 0 and 1.

In the embodiments shown in FIGS. 2 and 3, the device includes four functional units, namely, on the one hand, a voltage source SV and a current receiver RI in module A and, on the other hand, a current source SI and a voltage receiver RV in module B.

In the embodiment shown in FIG. 2, the voltage source SV1 and the current receiver RI1 are connected in series between the line L and ground. In module B, the current source SI1 is connected in parallel with the voltage receiver RV1 between the line L and the potential of a power supply source (not shown).

In the embodiment shown in FIG. 3, the voltage source SV2 and the current receiver RI2 are connected in series between the line L and the potential of the power supply source and, in the other module B, the current source SI2 is connected in parallel with the voltage receiver RV2 between the line L and ground.

The embodiments shown in FIGS. 2 and 3 function identically except that the current I in the line L does not flow in the same direction; in the case of FIG. 2, the current source SI1 imposes a current flowing in the same direction as the data signal transmitted from B towards A, whereas in the example of FIG. 3, the current I imposed by the current source SI2 flows in the opposite direction from that of the data signal that it carries from B towards A.

Unit SV is a controlled voltage source which functions as a voltage-current separator. When a controlled voltage V1 is applied to it as an input, this block produces, between points 1 and 2, a voltage $V = f(V1)$ that is independent of the current I passing through it.

The voltage receiver unit RV has a negligible input current and produces an output voltage $\hat{V}1$ which depends on the voltage V applied by the voltage source SV between points 3 and 4. The output voltage $\hat{V}1$ is therefore an image of the input voltage V1.

Unit SI is a controlled current source which, in response to the application to its input of a control voltage V2, produces a current $I = g(V2)$ that is independent of the potential difference between the terminals of this unit.

Finally, unit RI is a current receiver which produces an output voltage $\hat{V}2$ depending on the intensity of the current I passing through it. The output voltage $\hat{V}2$ is therefore an image of the input voltage V2.

The operation of the device shown in FIGS. 2 and 3 results from the above: when a voltage V1 is applied to the voltage source SV, this imposes on the line L a potential $V = f(V1)$ with respect to ground. The voltage receiver RV detects the voltage V and produces an output voltage $\hat{V}1$ that is an image of V1. The data signal V1 is therefore transmitted from module A to module B in the form of the voltage V present on the line L. Simultaneously, the current source SI imposes in the line L the flowing of a current I that depends on its input voltage V2. The current receiver detects this current I and converts it into an output voltage $\hat{V}2$ that is an image of the input voltage V2. A data signal is therefore transmitted from B to A in the form of the current I in flowing the line L.

The device described above can have numerous applications of which two possible examples have been shown in diagrammatic form in FIGS. 4A and 4B.

FIG. 4A illustrates the possibility of transmitting n parallel bits in full duplex using n electrical lines connected between two electronic modules A and B. FIG. 4B shows a similar application in which a master module A operating as a voltage source is connected by three links in parallel to three slave modules B1, B2 and B3 operating as current sources. For a number n of parallel links, the master module A enables the direct selection of a maximum of $2_n$ slave modules.

FIG. 5 shows a first example of implementation of the invention according to the embodiment shown in FIG. 3. The controlled voltage source SV2 comprises a differential amplifier 10 whose output is applied to the base of a transistor 11 whose collector is connected to the current receiver RI2 and whose emitter is connected to the electrical line L. The differential amplifier 10 is connected as a voltage follower, the voltage V1 representing the data signal to be transmitted to module B being applied to its positive input while its negative input is connected with the emitter of transistor 11 to the line L. The voltage receiver RV2 also comprises a differential amplifier 12 connected as a voltage follower: its positive input is connected to the line L while is negative input is connected to its output on which the voltage $\hat{V}1$ is present.

The current source SI2 comprises a differential amplifier 13 receiving on its positive input the voltage V2 representing the data signal to be transmitted to module A. The output of the differential amplifier 13 is applied to the base of a transistor 14 whose collector is directly connected to the line L and whose emitter is connected to ground via a resistor 15. The negative input of the differential amplifier 13 is connected between the resistor 15 and the emitter of the transistor 14. The current receiver RI2 comprises a resistor 16 connected in series between the power supply conductor 17 and the collector of the transistor 11. This current receiver also comprises a differential amplifier 18 whose negative input is connected to its output and whose positive input is connected between resistor 16 and the collector of transistor 11.

In operation, the voltage signal V1 applied to the input of the differential amplifier 10 appears again on the emitter of transistor 11 and, consequently, on the electrical line L. This voltage V1 applied to the positive input of the differential amplifier 12 therefor appears again at its output. The output voltage $\hat{V}1$ is therefore equal to the input voltage V1 apart from the voltage shifts due to the differential amplifiers 10 and 12.

For their part, the differential amplifier 13 and the transistor 14 of the current source SI2 impose a voltage V2 across the terminals of the resistor 15. This current source SI2 therefore imposes the flowing in the line L of a current $I = V2/R$, where R is the value of the resistor 15. The resistor 16 of the current receiver RI2 has the same value as the resistor 15 so that between the potential of the power supply source and the output of the differential amplifier 18 there is a voltage V2 that is equal to the input voltage V2 apart from the voltage shifts due to the differential amplifiers 13 and 18.

The example given above is adapted to an embodiment using bipolar technology for exchanging analog or digital data signals between modules A and B.

FIG. 6 shows a second example of embodiment in which the voltage source SV2 and the voltage receiver RV2 are unchanged while the current source SI2 and the current receiver RI2 are produced in a simplified form only allowing transmission of digital data signals from module B towards module A. The voltage signal V2 applied to the input of the current source SI2 can therefore take one or the other of two values representing the logic levels 0 and 1. This signal is applied to the base of a transistor 20 which operates in switching mode. The emitter of transistor 20 is directly connected to the power supply source. Its collector is connected to a resistor 22. A resistor 21 is connected between the emitter and the collector of the transistor 20. The resistor 22 is connected to the collector and to the base of a transistor 23 associated with a transistor 24 whose base is connected to that of the transistor 23. Transistors 23 and 24 form a current mirror, i.e. the current set in transistor 23 by the voltage applied to the base of transistor 20 is copied by transistor 24. In other words, when the voltage V2 makes transistor 20 conduct, this transistor short-circuits resistor 21 and imposes in transistor 23 a first current level I1 which is copied by transistor 24 and therefore flows in the line L. When the voltage V2 cuts off transistor 20, resistors 21 and 22 find themselves connected in series and transistor 23 sets a different current level I2 which transistor 24 copies and causes to flow in the line L.

The current receiver RI2 also comprises two transistors 25 and 26 connected as a current mirror. The emitter of transistor 25 is connected to the power supply bus. Its base and its collector are connected to the line L and to the base of transistor 26. Transistor 26 copies the current flowing in transistor 25 and its collector is applied to the base of a transistor 27 via a resistor 28. Depending on whether current I1 or I2 is flowing in transistor 26, the transistor 27 is cut-off or conducting, and a voltage representing a logic level 0 or 1 corresponding to that of the voltage signal V2 is found on its collector, connected to the power supply bus by means of a resistor 29.

In FIG. 7, the current source SI2 and the current receiver RI2 are produced in the same way as the similar components in FIG. 6 and the same numerical references have been retained to designate the corresponding components. In this third example, the particular embodiment of the voltage source SV2 and of the voltage receiver RV2 differs from that of FIGS. 5 and 6 and only allows transmission of digital data signals from module A to module B. The voltage source SV2 comprises a transistor 30 to whose base the logic signal of voltage V1 is applied via a resistor 31. The collector of transistor 30 is connected to the power supply bus 17 via a resistor 32 while its emitter is connected to ground via a set of two diodes 33 connected in series. A transistor 34 has its base connected to the collector of transistor 30, its emitter connected to the electrical line L and its collector connected to the collector of transistor 25.

The voltage receiver RV2 comprises a transistor 35 to whose base the voltage present on the line L is applied via a resistor 36. The emitter of transistor 35 is connected to the power supply voltage bus via a set of two diodes 37 connected in series and its collector is connected to ground via a resistor 38. The collector of transistor 35 is applied to the base of a transistor 39 via a resistor 40. The emitter of transistor 39 is connected to ground and its collector, on which the output voltage $\hat{V}1$ appears, is connected to the power supply voltage bus 17 via a resistor 41.

Depending on the logic level of the voltage signal V1 applied to its base, the transistor 30 is either conducting or cut-off. Transistor 34 consequently imposes on the line L a high level voltage or a low level voltage which is applied to the base of transistor 35 via resistor 36. Depending on the voltage level applied to its base, transistor 35 cuts off or turns on transistor 39 on whose collector an output voltage V1 is available which represents a complementary logic level to that represented by the voltage signal $\hat{V}1$ applied to transistor 30.

Even though the three specific embodiments given in FIGS. 5 to 7 are adapted to a bipolar technology embodiment using discrete circuits or integrated circuits, the various units of the device according to the invention can of course be produced using any other technology, for example using MOS technology.

FIG. 8 shows the transmission device according to the invention associated with an electronic ignition control system for an internal combustion engine.

This system includes a coil ignition spark generator module A and a module B for the production of the signal for starting conduction in the coil. The basic functions fulfilled by modules A and B are already known and it will be possible to refer to document EP-A No. -51,529 which gives a detailed description of them.

Module A comprises an ignition coil whose primary 41 is connected in series between the two poles of the power supply source via an electronic switch such as a transistor 42 and a resistor 43. The secondary 44 of the coil is connected between ground and a distributor 45 which distributes the high voltage generated by the secondary 44 of the coil to a series of spark plugs 46. The switch 42 is controlled by a unit 47 which receives the data signal for starting conduction in the coil provided by module B and controls the flowing and the regulation of the current in the coil. This regulation is provided by means of a unit 48 which detects the current IB flowing in the primary 41 and which, when this current reaches a nominal value IB, applies to unit 47 a signal such that this unit then maintains the current in the primary 41 at its nominal value until the moment of ignition.

Module B comprises a unit 50 for the production of the start coil conduction signal, which can be formed by the output stage of an ignition computer as described in the abovementioned European Patent Application. This unit 50 determines the optimum duration of conduction in the coil in order to reduce the regulation period between the time at which the current in the primary of the coil has reached its nominal value and the moment of ignition to that which is strictly necessary. For this purpose, unit 50 receives, on the one hand, data such as the instantaneous speed of rotation of the engine provided to it by the ignition computer (not shown) and, on the other hand, data relating to the regulation time, provided by unit 48 in module A. The conduction angle is therefore calculated during each cycle as a function of the speed of rotation of the engine, and of the conduction and regulation times measured during the previous cycle and whose difference represents the strictly necessary time for obtaining the nominal energy at the terminals of the coil.

In the abovementioned European Patent, data relating to the starting of conduction in the primary and to the regulation time of the current are exchanged between modules A and B by means of two separate electrical links. In the example of FIG. 8, these two data signals are simultaneously transmitted over the same electrical line L. For this purpose, unit 50 is connected to unit 47 via a current source SI and a current receiver RI which are connected to each other by the single electrical line L. Also, unit 48 applies a voltage signal V1 representing the data relating to the regulation time to, a voltage source SV. This data transmitted in the form of a voltage on line L is detected by the voltage receiver RV whose output applies an output signal $\hat{V}1$ that is an image of the input signal V1 to unit 50.

The operation of the circuit in FIG. 8 will be better understood by also referring to the timing diagram in FIG. 9. The current source SI is capable of imposing in the line L a current which can have a low value Ii less than a threshold IO or a high value Is greater than this threshold. Also, the voltage source SV can impose on the line a voltage which can have a low value Vi less than a threshold VO or a high value Vs greater than this threshold.

When outside the conduction period of the coil, unit 50 applies to current source SI a voltage signal V2 such that the source makes a current Ii that is lower than the threshold IO flow in the line L. This current is recognized as such by the current receiver RI which applies to unit 47 a voltage $\hat{V}2$ such that the electronic switch 42 is cutoff. Consequently no current flows in the primary 41 and unit 48 applies to the voltage source SV a voltage V1 such that this source applies to the line L a voltage Vi less than the threshold VO. This voltage is detected by the voltage receiver RV which applies to unit 50 a logic level $\hat{V}1$ that is an image of the level V1 at the input of the source. When at time t1, the signal V2 changes state to command the start of conduction in the primary, the source SI imposes the flowing of a current of value Is greater than the threshold IO in the line L. This change of state detected by the current receiver RI causes the switching on of the electronic switch by unit 47 and the start of conduction in the primary. However, the signals V1 and $\hat{V}1$ do not change state since the current in the primary is still less than its nominal value. When, at time t2, this current becomes equal to nominal IB, this is detected by unit 48 which transmits this data signal to unit 47 and to the voltage source SV. From that time the voltage source SV imposes on the line L a voltage level Vs greater than the threshold VO. This level Vs is detected by the voltage receiver RV whose output $\hat{V}1$ takes a logic level that is an image of that applied to the voltage source. Simultaneously, unit 47 begins to regulate the current flowing in the primary 41 in order to limit it to the nominal value IB until the ignition firing time t3 at which the switch 42 is again cut-off and the flow of current IB is interrupted. Because of this, the current and the voltage imposed on line L both return to a low level, Vi and Ii respectively, until the next conduction cycle.

If the high levels of voltage and current on the line L are considered which correspond to a logic 1 level and low levels of these same variables are considered which correspond to a logic 0 level, the following combinations of logic states are possible.

before t1 and after t3 : I = 0 and V = 0
before t1 and t2 : I = 1 and V = 0
between t2 and t3 : I = 1 and V = 1
the state I = 0 and V = 1 being impossible.

This latter particularity enables in this case a simplified embodiment of the voltage source SV. In fact it is sufficient for it to be able to generate a voltage Vs greater than the threshold Vo in the single case in which the current flowing in the line is greater than the threshold Io.

The performances of the device described depend :
firstly, on the characteristic physical constants of the line which introduce a certain crosstalk associated with the transmission frequency of V and I. Thus for a line of 1m length having the following characteristics : l=1 micro-H/m and c =100 pF/m, it is possible to produce a crosstalk of 1% for a frequency of 159 kHz,
secondly, on the embodiment of units SV, SI, RV and RI according to which greater or lesser additional coupling is introduced between I and V.

We claim:

1. Device for the simultaneous transmission of two data signals over the same electrical line in opposite directions, wherein the data signals are represented by an electrical voltage and current, respectively, present on said line, the device comprising:
at least one controlled voltage source and a current receiver capable of detecting the current flowing in said line at the first end of said line;
at least one controlled current source and a voltage receiver capable of detecting the voltage present on said line at the second end of said line;
wherein the two signals are provided to said device in the form of first and second voltage signals, the device being characterized in that
said controlled voltage source comprises a differential amplifier connected as a voltage follower whose output imposes on said line a voltage depending on said first voltage signal which is applied to it as an input and is applied to a transistor whose emitter-collector circuit is connected in series with said current receiver;
said voltage receiver comprises a differential amplifier connected as a voltage follower connected in parallel with said controlled current source and generates from the voltage detected on said line an ouput voltage that is an image of said first voltage signal;
said controlled current source imposes in said line the flow of a current depending on said second voltage signal which is applied to it as an input; and
said current receiver generates from the current detected in said line an output voltage which is an image of said second voltage signal.

2. Device according to claim 1, characterized in that said voltage source and said current receiver are connected to a first electronic module for the generation of coil ignition sparks for an internal combustion engine and said current source and said voltage receiver are associated with a second electronic module for the production of the signal for starting conduction in the coil, and in that,
said first module comprises means of controlling the conduction of the coil and of regulating the current in the coil as well as means of detecting the current in said coil;
said second module comprises means of computing the conduction time of said coil depending on the conduction time and on the regulation time measured during the previous conduction cycle;
said voltage source is connected to said means of detection in order to transmit to said second module, via said voltage receiver, data signals relating to said regulation time in the form of a voltage applied to said line; and
said current source is connected to said second module in order to transmit to said first module, via said current receiver, data signals relating to said calculated conduction time in the form of a current flowing in said line.

3. Device for the simultaneous transmission of two data signals over the same electrical line in opposite directions, wherein the data signals are represented by an electrical voltage and current, respectively, present on said line, the device comprising:
at least one controlled voltage source and a current receiver capable of detecting the current flowing in said line at the first end of said line;
at least one controlled current source and a voltage receiver capable of detecting the voltage present on said line at the second end of said line;
wherein the two data signals are provided to said device in the form of first and second voltage signals, the device being characterized in that
said controlled voltage source imposes on said line a voltage depending on said first voltage signal which is applied to it as an input;

said voltage receiver generates from the voltage detected on said line an output voltage that is an image of said first voltage signal;

said controlled current source comprises a differential amplifier whose output is applied to a transistor having its emitter-collector circuit connected in series with a resistor wherein said transistor imposes a current depending on said second voltage signal applied to one of the inputs of said differential amplifier; and said current receiver comprises another resistor through which said current flows and a differential amplifier connected to said another resistor in order to produce at its output a voltage depending on said current, which voltage is an image of said second voltage signal.

4. Device according to claim 1, wherein said second voltage signal is capable of having two values representing logic levels "0" and "1", characterized in that said current source comprises:

an input transistor and two first transistors connected as a current mirror in order to selectively impose in said line a first and a second current intensity in response to the application on the base of said input transistor of said voltage signal representing logic levels "0" and "1" respectively, and said current receiver comprises two second transistors connected as a current mirror and an output transistor producing an output voltage representing logic levels in response to the detection of said first and second current intensities by said second transistors.

* * * * *